Oct. 6, 1970     J. C. MAYS     3,531,926
SAFETY CONTROL SYSTEM FOR SELF PROPELLED VEHICLE
Filed Dec. 20, 1967     3 Sheets-Sheet 1
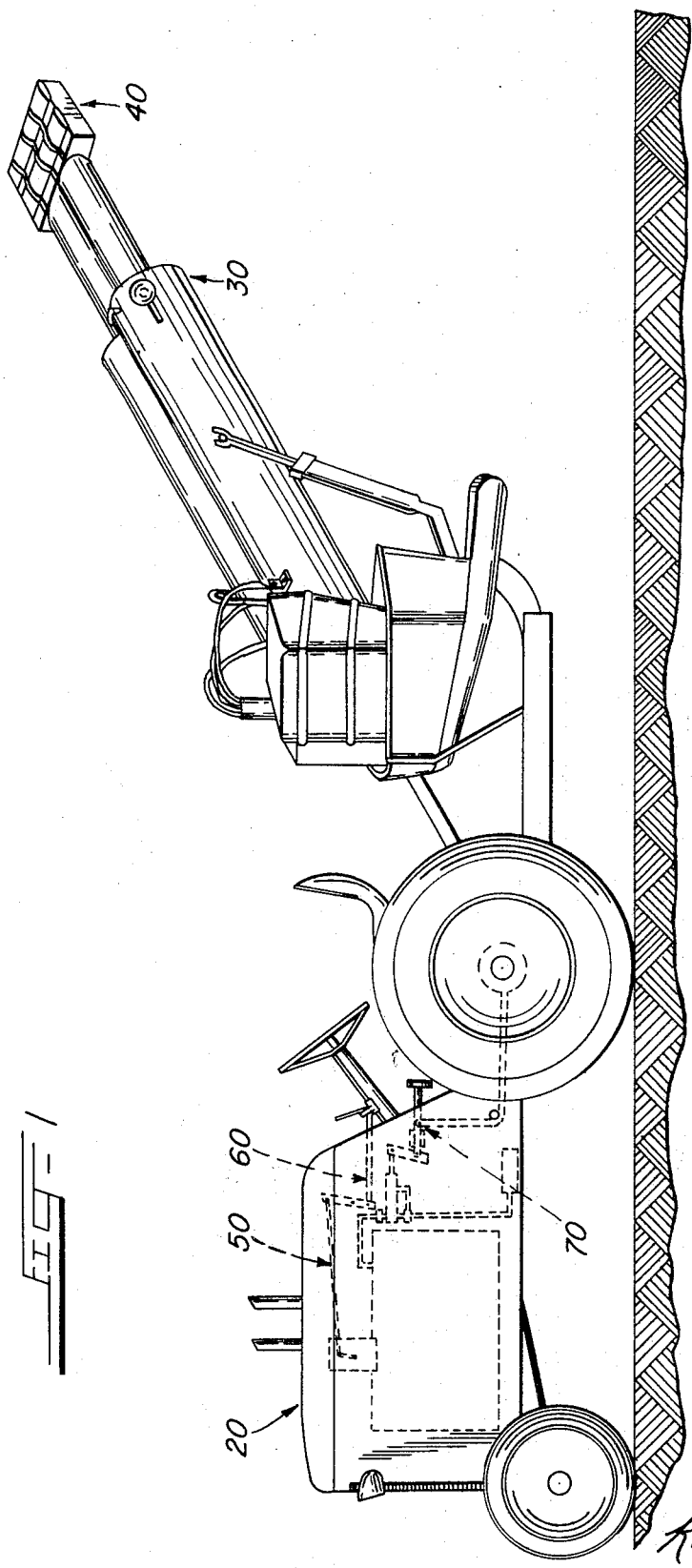
INVENTOR.
JOHN C. MAYS

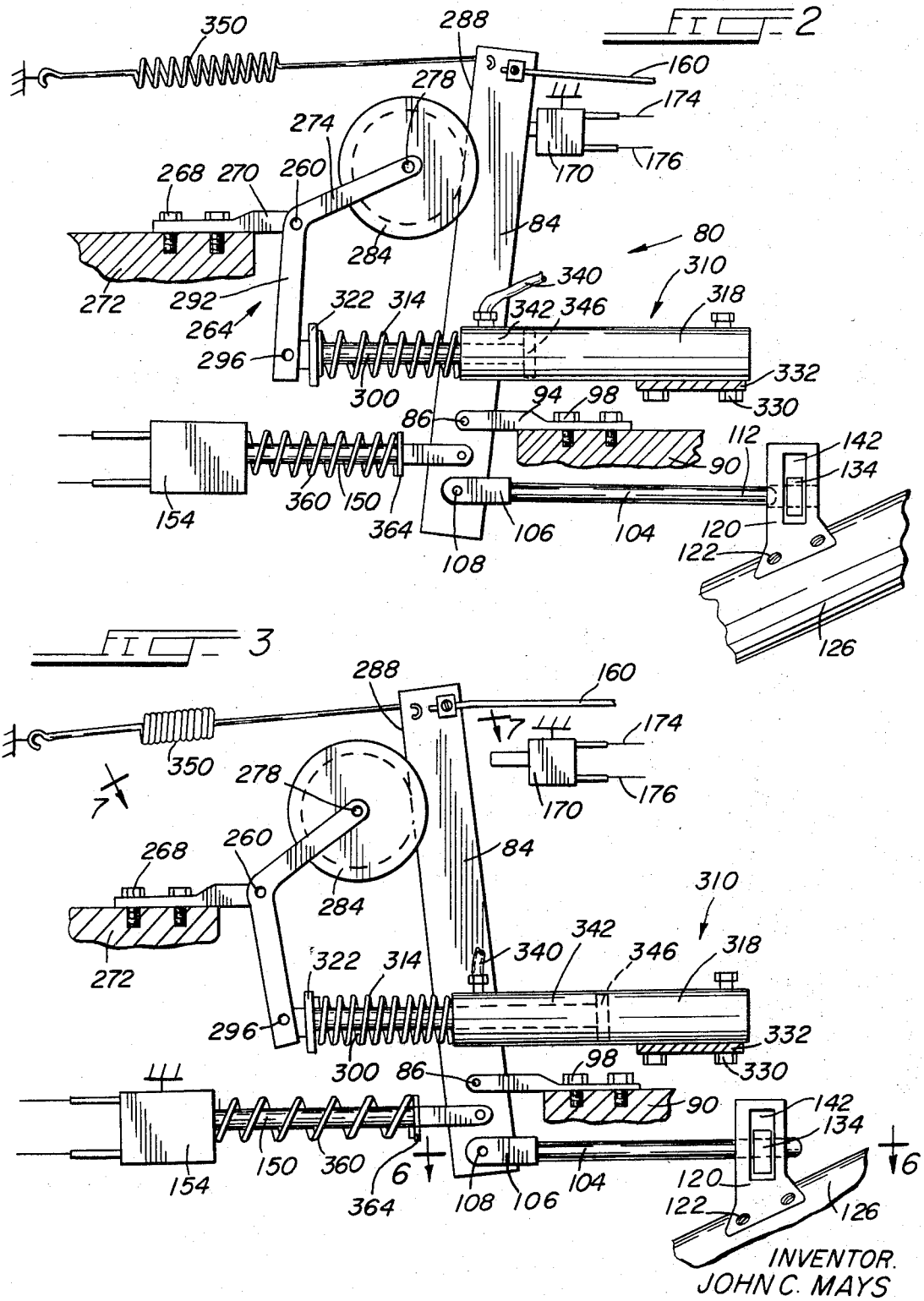

Oct. 6, 1970
J. C. MAYS
3,531,926
SAFETY CONTROL SYSTEM FOR SELF PROPELLED VEHICLE
Filed Dec. 20, 1967
3 Sheets-Sheet 3
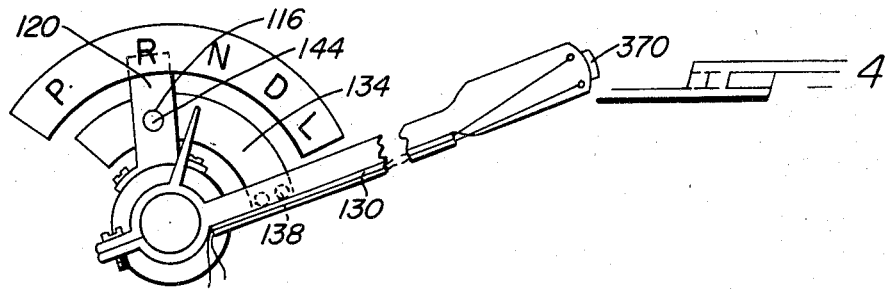
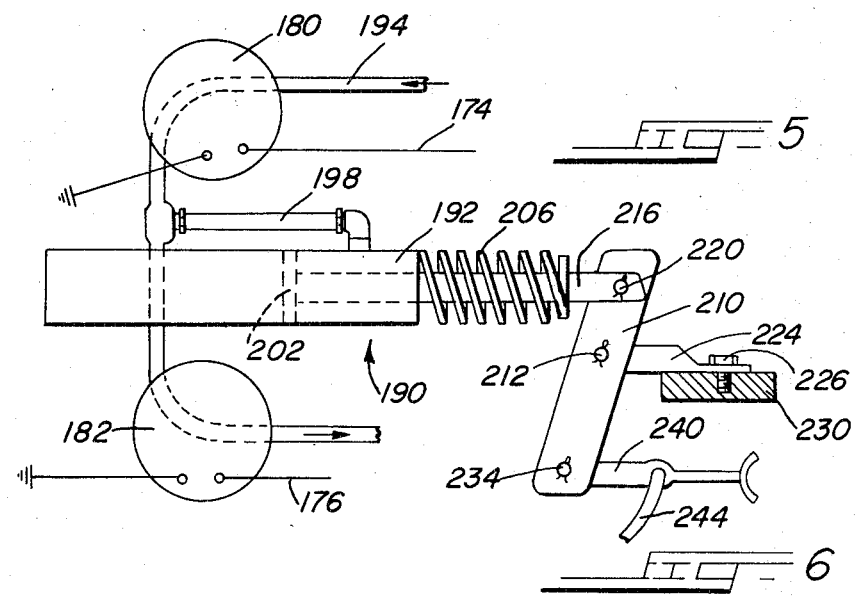
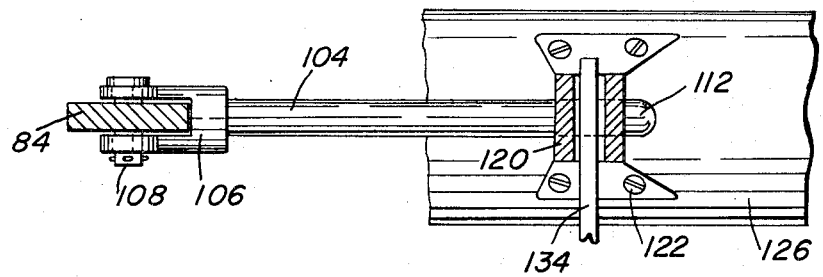
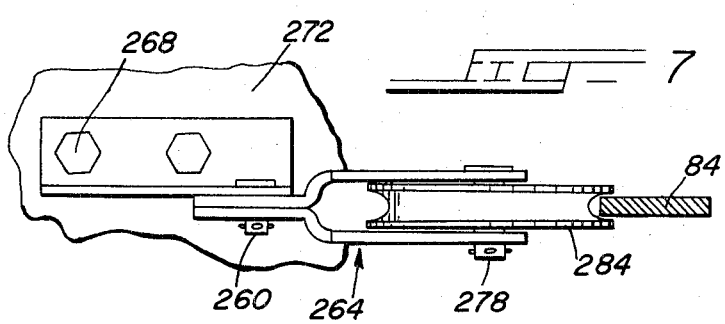
INVENTOR
JOHN C. MAYS
BY Kegan, Kegan & Berkman
ATTYS.

United States Patent Office 3,531,926
Patented Oct. 6, 1970

3,531,926
SAFETY CONTROL SYSTEM FOR SELF PROPELLED VEHICLE
John C. Mays, Vero Beach, Fla., assignor to Cooper-Mays Harvesters, Inc., Vero Beach, Fla., a corporation of Florida
Filed Dec. 20, 1967, Ser. No. 692,048
Int. Cl. A01g 19/00
U.S. Cl. 56—328        10 Claims

ABSTRACT OF THE DISCLOSURE

A safety control system for a vehicle-carried harvesting apparatus and including means for locking the drive selector of the vehicle, means for locking the brakes of the vehicle, and means for controlling engine speed of the vehicle during harvesting operations.

---

This invention relates to a control system for a self propelled vehicle such as a tractor or truck. More particularly, the invention is directed to a safety system for controlling the transmission setting, engine speed, and braking operations of a vehicle serving as support means, transporting means, and power means for specialized apparatus or equipment such as a harvesting machine.

For purposes of illustrative disclosure, and not by way of limitation, the control system of the invention is described herein with reference to a machine for harvesting citrus fruit. Such a machine is the subject of a commonly assigned U.S. patent application Ser. No. 600,410, filed Dec. 9, 1966, and the entire disclosure of that application is hereby incorporated herein by reference. In the structure referred to, a truck or tractor carries an extensible and manipulable boom which projects upwardly and outwardly of the truck base or frame. A picker head supported at the outward extremity of the boom and energized through hydraulic motors engages tree-carried fruit grasps and removes the fruit by a combined twisting and a pulling action. In preferred embodiments of the harvesting machine power for the hydraulic systems is furnished by the internal combustion engine of the truck or tractor.

In the normal use of harvesting equipment of the type in connection with which the present invention finds utility, the self-propelled vehicle (on which the picker head is supported) is transported, as required, from picking site to picking site. At each site, while the vehicle itself must be stabilized and must be secured against movement relative to the terrain, the engine must be operated in order to power the motors which energize and drive the boom and the fruit picker head. The drive selector arm or shift control arm of the vehicle transmission system must be in "neutral," vehicle wheels must be locked, and required engine speed must be maintained. All of these interrelated conditions must be achieved rapidly and safely so that reliable and efficient operation is assured. It is the aim of the present invention to provide a safety control system which is highly reliable, which is substantially fully automatic in operation, and which obviates human error during the several and sequential modes of operation of the vehicle itself as well as the harvesting apparatus supported on and powered by the vehicle.

It is an important feature of the safety control system of the invention that it simply yet effectively achieves the following functions:

(1) Automatic maintenance of required engine r.p.m. during the fruit picking operation.

(2) Locking of the engine transmission setting in a neutral position during harvesting operations.

(3) Providing interlock means to preclude the release of the drive selector arm from a neutral (transmission setting) position unless engine r.p.m. is reduced.

(4) Providing an override mechanism to permit increase in and control of engine r.p.m. as required, as when moving the vehicle and the harvesting apparatus to a new picking site.

(5) Automatically setting the vehicle brakes, this occurring when the drive selector is positioned in neutral and the engine speed is increased.

(6) Providing a complete override of all of the special controls so that the vehicle may be driven on the road as a conventional truck or tractor.

While all of the elements of the novel safety control system of the invention are functionally interrelated and while the elements combine and cooperate with one another to effect the purposes of the invention, the system itself may be, and in the interest of simplifying its description, is divided into several sub-assemblies or basic functional units including:

A governor for controlling engine speed; a master control unit for locking the transmission shift arm or the drive selector arm in neutral, and means for releasing the drive selector arm; and an automatically energized and releasing wheel or brake locking assembly. In the paragraphs below each of the sub-assemblies will be considered in turn and the operation of the structural elements of each assembly will be described with reference to the interrelationship between the various sub-assemblies, and the overall functioning of the machine itself.

Other objects, features, and advantages of the invention will become apparent from a reading of the following specification taken in conjunction with the drawing in which:

FIG. 1 is a perspective view of a vehicle and an associated harvesting apparatus, the assemblies of the safety control system of the invention being indicated schematically in broken lines;

FIG. 2 is a diagrammatic and somewhat schematic representation of the master control arm of the safety control system and indicating functional relationship between the control arm being shown in a "driving" condition of the vehicle;

FIG. 3 is a view similar to FIG. 2, but showing the control arm in a "harvesting" condition of the equipment;

FIG. 4 is a fragmentary top plan view showing details of the drive selector locking means of the invention;

FIG. 5 is a diagrammatic representation of the brake-locking assembly of the safety control system;

FIG. 6 is a cross-sectional view taken on the line 6—6 of FIG. 3; and

FIG. 7 is a cross-sectional view taken on the line 7—7 of FIG. 3.

The aims and objects of the invention are accomplished through a novel, highly effective, yet conveniently simple safety control system which includes engine speed controlling governor means; a master control unit which locks the drive selector arm in a neutral position during the harvesting operation while permitting release of the drive selector arm when it is necessary to move the vehicle to a new picking site; and a vehicle brake actuating system automatically operable when the drive selector arm is positioned or secured in a neutral drive position and the machine is set to perform its harvesting functions, the braking system precluding shifting or movement of the principal vehicle on the supporting terrain during the harvesting operations. The specific structural features of each of the several or sub-assemblies of the invention are described in detail with reference to the drawings.

Referring more particularly to the drawings, there is shown in FIG. 1 a vehicle 20 which functionally supports, constitutes the transporting means for, and powers a picking boom 30 and a picker head 40. While the vehicle 20 is represented as a tractor, it will be appreciated that a truck may be used, and the vehicle 20 is not, per se, a part of the present invention. Moreover, the novel safety control system of the invention may be used in cooperation with any type of tractor or truck, particularly of the automatic transmission type.

In FIG. 1 the positions and functional disposition of the several assemblies of the safety control system are indicated diagrammatically in broken lines. These assemblies, which include the governor means 50, the drive selector arm control means 60, and the brake locking and release assembly 70, are each described below.

Referring more particularly to FIGS. 2 and 3, the required coordination of the various assemblies of the safety control system of the invention is achieved by means of a master control unit 80 which includes a master control arm 84, which is distinct from the drive selector arm of the vehicle and is pivotally secured at 86 to the steering column assembly 90 on the vehicle 20 by means of a bracket 94 and associated bolts 98. As indicated schematically in FIGS. 2 and 3, the master control arm 84 is selectively positionable between a "normal driving position" (FIG. 2), and a "harvesting position" (FIG. 3). Functionally coupled to and operatively responsive to the movement or positioning of the master control arm 84 are several associated control elements the role of each of which will be considered in turn as the description proceeds.

One of the control elements comprises a shift locking rod or drive selector locking rod 104 connected to the lower end of the master control arm 84, by means of a yoke 106 and pivot pin 108. The outwardly extending free end 112 of the rod 104 projects into and is supported within a through opening 116 formed in a guide, plate, or bushing 120 secured at 122 to the steering column 126 of the vehicle 20 and extending generally transversely thereof at a position adjacent the drive selector arm or shift arm 130. An arcuately swingable selector locking plate 134, secured to the drive selector arm 130 by means of suitable bolts 138 and movable with the drive selector arm 130 rides within and through a slot 142 defined by the guide 120, as shown in FIGS. 2 and 4. The drive selector locking plate 134 has formed therethrough a hole or bore 144 which, in the neutral position of the drive selector arm 130 is an alignment with the through opening 116 formed in the drive selector locking plate 120, so that it is only in this "neutral" transmission position that the shift lock rod 104 can pass through the opening 116 in the guide 120 and enter the aligned hole 144 in the drive selector locking plate 134 to lock the drive selector arm 130 in place (FIG. 3).

Also connected to the master control arm 84 at its lower end is the core element or shiftable, rod-like plug component 150 of a solenoid 154, whereby upon actuation the solenoid 154 is effective to pull and pivot the master control arm 84 clockwise about its pivot 86 to withdraw the shift lock rod 104 from its drive selector locking position (FIG. 3) to its shift lock freeing position (FIG. 2), as will be more fully described herebelow.

Fastened to the master control arm 84 at its upper end is a governor control cable 160 operably connected to an engine speed regulating governor so that in the normal driving position of the master control arm 84 (FIG. 2) the governor would, except for overriding provisions, dictate low engine speed. In the harvesting position of the master control arm 84 (FIG. 3) pull on the governor control cable 160 effects an increase in engine speed. The governor itself (not shown) is a conventional centrifugal-belt-driven unit turning at approximately engine r.p.m. and having a control arm connected to the carburetor of the engine in an adjustable internally spring-loaded linkage. The arrangement is conventional. As the governor requires an increase in speed, the linkage pulls on the throttle, opening the throttle plate. Since the particular design of the governor forms no part of the present invention, no further description s required. It is pointed out, however, that the normal foot control linkage to the carburetor is standard and unchanged, thus permitting the internal spring-loaded arm to be compressed or shortened even though the governor may "attempt" to cause the throttle to close. Through this arrangement, the foot control is at all times capable of overriding the governor control.

Supported for operational engagement with the master control arm 84 is a brake control switch 170 which is electrically connected by means of leads 174 and 176 to a pair of solenoid valves 180 and 182 which control and direct the flow of hydraulic fluid to a brake control assembly 190 (FIG. 5) which operates to set the rear brakes of the vehicle 20 when the master control arm 84 is in the "harvesting" position (FIG. 3).

Referring more particularly to FIG. 5, in the normal driving position of the master control arm 84, as indicated in FIG. 2, the connections of the brake control switch 170 are such that solenoid valve 180 is closed and solenoid valve 182 is open, and flow of pressurized hydraulic fluid into the brake control cylinder 192 through conduits 194 and 198 is blocked. No pressure is applied against the piston 202 of the hydraulic assembly 190, and the coil spring 206 effectively pivots the brake actuating link 210 about its support 212, through the piston rod 216. A mounting bracket 224 bolted at 226 to a supporting wall 230 or frame member of the vehicle secures the control link 210 in place. Secured to the brake actuating arm or link 210 at its lower end through a pin 234 is a brake actuating pull rod 240 to which is secured a brake cable 244 so that shifting movement of the brake actuating pull rod 240 to the right as viewed in FIG. 5 tightens the cable 244 and locks the rear wheels of the vehicle. In accordance with the practice of the invention, actuation of the brake control assembly 190 is achieved automatically when the master control arm 84 assumes the harvesting position as shown in FIG. 3. Shifting of the master control arm from the position of FIG. 2 to the position of FIG. 3 energizes the brake control switch 170 to open the normally closed solenoid valve 180 and to close the normally open solenoid valve 182 (FIG. 5). With the solenoid valves so disposed, application of pressurized hydraulic fluid from the hydraulic motors of the harvesting apparatus through the conduits 194 and 198 and into the cylinder chambers 192 of the assembly 190 shifts the piston 202 axially inwardly of the cylinder chamber. The brake actuating link 210 pivots counter-clockwise about its pivot pin 212 and tensions the brake cable 244 to lock the brakes.

Referring again to FIG. 2, in which the master control arm 84 is shown in the position assumed during normal driving of the vehicle, the arm 84 is normally biased to the clockwise rotational position by means of an assembly which includes a pivotally mounted master override link 264 bolted at 268, as shown in FIG. 2, through a pin 260 and a bracket 270, to the chassis 272 of the vehicle 20. One arm 274 of the link 264 carries at its end a rotatably supported 278 wheel-like cam element 284 which bears against a longitudinally extending edge 288 of the master control arm 84. A second arm 292, its end pivotally secured at 296 to a piston rod 300 is biased axially outwardly of a piston and cylinder assembly 310 by means of a compression spring 314 interposed between an end wall of the cylinder 318 and an annular flange or collar 322 secured to the piston rod 300. The cylinder 318 is firmly secured or anchored 330 to the frame or chassis 332 of the vehicle 20. A fluid conduit or line 340 communicating with a conventional hydraulic pump (not shown) supplying pressurized fluid is connected to deliver the fluid into the chamber 342 of the cylinder 318 to shift the piston 346 and the piston rod 300 attached thereto axially inwardly into the cylinder 318, against the pressure of the spring 314, whereby the master control arm 84 assumes the position shown in FIG. 3.

From the foregoing description it will be appreciated that pivotal shifting of the master control arm 84 to the position shown in FIG. 3, and occurring through the action of the anchor spring 350 when the opposing extension spring 314 is neutralized as the piston 346 of the piston and cylinder assembly 310 is forced axially inwardly, can occur only when the arcuately shiftable drive selector locking plate 134 is so oriented with respect to its guiding bracket or bushing 120 that the slot 116 in the bushing and the through hole 144 in the locking plate 134 are in alignment, permitting insertion of the shift locking rod 104 therethrough. This alignment occurs only when the drive selector arm 130 is in the "neutral" position. (FIG. 3 and FIG. 6). A coil spring 360 disposed coaxially with and annularly about the shift lock control rod 150 of the shift lock control solenoid 154 is interposed between solenoid 154 and a flange or collar 364 secured on the rod 150 and acts to bias the lower end of the master control arm 84 to the right as viewed in FIG. 3 to facilitate projection of the shift lock control rod 104 through the aligned openings 116 and 144 of the transmission shift lock assembly when the vehicle is in a neutral drive position, and the apparatus is to be operated as a harvester.

Pivotal shifting of the master control arm 84 from the harvesting position shown in FIG. 3 to the normal driving position shown in FIG. 2 is effected through energization or actuation of the shift lock control solenoid 154 by means of a button-type control switch 370 mounted on the end of the drive selector arm 130, as shown in FIG. 4. At the same time, hydraulic pressure to the piston and cylinder assembly 310 of the override system is removed and the override link 264, aided through the spring 314 pivots clockwise to assume the position of FIG. 2. The master control arm 84 is cammed into engagement with the brake control switch 170, and tension being removed from the governor control cable 160, the engine speed is reduced.

The various sub-assemblies and the component elements of the safety control system of the invention having been described in detail, the following brief description of a complete cycle of operation will be more readily understood. During transprtation operations or in normal driving (FIG. 2), the spring-loaded piston and cylinder assembly 310 responds to extension forces of the spring 314 to pivot the override arm or master pivot arm or link 264 clockwise to lock or to hold all other operations in a neutral or disengaged position. The shift control lever 130 is free to move into any position, and the normal foot throttle (not shown) operates conventionally, except for a slightly increased spring loading at higher speeds due to compression of the spring in the governor assembly.

With the vehicle-supported harvesting apparatus on location for picking, the energized hydraulic motors force hydraulic fluid into the cylinder and piston assembly 310 to overcome the force of the override arm positioning spring 314, thus pivoting the override arm or link 264 counterclockwise to permit pivotal shifting of the master control arm 84 counterclockwise. With the drive selector arm or shift selector arm 130 in any position other than neutral, the shift lock control rod 104 merely rides on the drive selector locking plate 134, and full pivotal movement of the master control arm 84 to the harvesting position of FIG. 3 is obviated. Under these conditions, the engine speed is maintained at an idling speed and application of pressurized hydraulic fluid to the hydraulic brake actuating system is blocked by the normally closed solenoid valve 180. Operation of the vehicle is normal.

Upon selection of a site at which to conduct the harvesting operation, the drive selector arm or shift selector arm 130 is moved to "neutral." Pressurized hydraulic fluid is applied to piston 346 whereupon the shift lock rod 104, responding to to enter into the now aligned openings or holes 116 and 144 in the guide plate 120 and in the drive selector locking plate 134 to lock the transmission shift arm 130. At the same time, the governor control cable 160 is tensioned, setting the governor to provide the desired engine r.p.m. Also, as the master control arm 84 pivots counter-clockwise to the position shown in FIG. 3, the brake control switch 170 is actuated, opening the normally closed solenoid 180 and closing the normally opened solenoid valve 182 to introduce pressurized hydraulic fluid into the brake control hydraulic assembly 190 (FIG. 5), actuating the brake link 210, applying braking force to the rear wheels of the vehicle through the brake cable 244. The entire system is now locked, brakes are set, and engine speed is up. The apparatus is set for the harvesting operation.

When it is desired to move the apparatus to the next harvesting site, the operator depresses the switch 370 at the end of the shift selector arm 130 thereby energizing the shift locking rod control solenoid 154 to withdraw the shift lock control rod 104 from engagement with the drive selector locking plate 134. The force of the coil spring 360 is overcome and the master control arm 84 pivots clockwise against the force of return spring 350 to assume the position shown in FIG. 2. Changes in electrical connections are effected in the brake control switch 170, solenoid-controlled hydraulic valve 180 closing and solenoid operated hydraulic valve 182 opening, whereupon fluid pressure is removed from the hydraulic brake assembly 190 and the return spring 206 of the assembly repositions the pivotal lever 210 to remove tension from the brake actuating cable 244. At the same time, tension is removed from the governor control cable 160, and the engine returns to idling speed. As the pressurized hydraulic system is disengaged from the hydraulic assembly 310 of the override pivot arm assembly, the latter assumes the "override" position shown in FIG. 2 and the vehicle is in condition for driving.

Such a very important consideration in the overall operation of the above described system is safety, the controlling sub-assemblies are provided with highly reliable compression springs which are exceedingly resistant to breakage and which, even in the event of mechanical failure, will still operate sufficiently effectively to return all systems to "normal." Accordingly, such contingencies as burned out fuses, broken hydraulic lines, or electrical shorts, although interfering with the proper operation of the system will not pose any safety hazard.

While for purposes of illustrative disclosure the above described system has been considered in detail as applied to a harvesting apparatus, it is to be understood that the invention is in no sense so limited and that many other applications are possible and are contemplated.

While a disclosure of a preferred embodiment of the safety control system of the invention has been provided, it will be apparent that numerous modifications and variations thereof may be made without departing from underlying principles of the invention. It is, therefore, desired by the following claims to include within the scope of the invention all such variations and modifications by which substantially the results of this invention may be obtained through the use of substantially the same or equivalent means.

What is claimed is:

1. In a control system for a self-propelled internal-combustion-engine-driven vehicle including a drive selector arm and carrying specialized operating apparatus such as a fruit harvester provided with a fruit picker head, means to hold said vehicle in secured fixed position relative to supporting terrain during functional operations of said apparatus carried by said vehicle, said operations including fruit harvesting operations,
means for maintaining engine speed at a level to ensure requisite power for driving said picker head of said harvester during fruit harvesting operations,
engine drive selector shift lock means to obviate inadvertent shifting of the drive selector arm of said vehicle and to lock said vehicle in a neutral driving position during said harvesting operations, and
a master control arm distinct from the drive selector arm and selectively shiftable between a normal driving condition and a harvesting condition of the vehicle.

2. The combination with a self propelled vehicle including a drive selector arm, and harvesting apparatus carried by said vehicle of a control system for ensuring safe and efficient operation of said apparatus during harvesting operations, said control system comprising:
a master control arm distinct from the drive selector arm,
bracket means supporting said master control arm on a frame element of said vehicle for movement relative thereto,
said control arm being selectively shiftable between a first position correlated with a normal drive condition of said vehicle and a second position correlated with harvesting operations carried out by said harvesting apparatus, and
control means operatively coupled with said master control arm and functionally responsive thereto upon shifting thereof to establish selectively a driving condition and a harvesting condition of said vehicle and harvesting apparatus, each said condition being correlated with a respective said first and second positions of said control arm.

3. The control system as set forth in claim 2, and further comprising
first spring means connected to and normally biasing said control arm to said first position,
means selectively actuable to overcome bias forces of said first spring means and operable upon actuation to shift said control arm from said first to said second position.

4. The control system as set forth in claim 2 and further comprising,
rod means movable axially to interengage and to lock a transmission drive selector arm of said vehicle in a neutral position,
means coupling said rod means to said control arm to effect axial displacement of said rod means to interengage and lock said drive selector arm in said netural position in response to shifting of said control arm to said second position.

5. The control system as set forth in claim 2 and further comprising
a hydraulically powered brake-actuating piston and cylinder assembly for energizing brakes of said vehicle,
electrical switch means coupled with and operatively responsive to shifting of said master control arm to said second position,
solenoid valve means actuated through said switch means and operable to channel pressurized hydraulic fluid to said piston and cylinder assembly to effect displacement of a piston of said piston and cylinder assembly,
piston rod means connected to said piston of said piston and cylinder assembly and shiftable axially upon actuation of said assembly,
brake cable means operatively connected to braking elements of said vehicle, and
linkage means coupling said brake cable means to said piston rod means for tensioning said cable means to actuate said braking elements and to lock said brakes of said vehicle when said master control arm shifts to said second position.

6. The control system as set forth in claim 3 wherein said means selectively actuable and operable to shift said control arm to said second position comprises
second spring means opposing said first spring means and effective upon overcoming of the said bias forces of said first spring means to shift said master control arm to said second position.

7. The control system as set forth in claim 3 wherein said means selectively operable to overcome the bias of said first spring means comprises a hydraulic assembly, and means operatively coupled to said first spring means to effect compression thereof and to neturalize said first spring means as a biasing force acting on said master control arm.

8. The control system as set forth in claim 4 and further comprising means coupled to said rod means for shifting said rod means out of engagement with the drive selector arm to free the drive selector arm in response to shifting of said control arm to said first position.

9. The control system as set forth in claim 8 wherein said means for shifting said rod means from engagement with the drive selector arms comprises rod-coupled electrical solenoid means, and further comprising switch means operable to actuate said solenoid means to shift said rod means.

10. The combination with a self propelled vehicle including a drive selector arm, and harvesting apparatus carried by said vehicle of a control system for ensuring safe and efficient operation of said apparatus during harvesting operations, said control system comprising:
a master control arm distinct from the drive selector arm,
bracket means supporting said master control arm on a frame element of said vehicle for movement relative thereto,
said control arm being selectively shiftable between a first position correlated with a normal driving condition of said vehicle and a second position correlated with harvesting operations carried out by said harvesting apparatus, and
control means operatively coupled with said master control arm and functionally responsive thereto upon shifting thereof to establish selectively a drive condition and a harvesting condition of said vehicle and harvesting apparatus, each said condition being correlated with a respective said first and second positions of said control arm.
said control means including engine speed regulating governor means operatively coupled to said master control arm to effect increase in speed of an engine of said vehicle in response to shifting of said control arm to said second position.

References Cited

UNITED STATES PATENTS

| | | | |
|---|---|---|---|
| 3,003,605 | 10/1961 | Apple | 192—4 |
| 3,110,355 | 11/1963 | Tranbarger et al. | 192—4 X |
| 3,153,311 | 10/1964 | Pool | 56—328 |
| 3,401,514 | 9/1968 | Clark | 56—328 |
| 3,439,481 | 4/1969 | Hall | 56—328 |

LOUIS G. MANCENE, Primary Examiner

J. A. OLIFF, Assistant Examiner

U.S. Cl. X.R.

180—53, 70